United States Patent

[11] 3,599,939

| [72] | Inventor | Louis M. O'Brien<br>1033 S. 2nd St., Alhambra, Calif. 91800 |
|---|---|---|
| [21] | Appl. No. | 810,627 |
| [22] | Filed | Mar. 26, 1969 |
| [45] | Patented | Aug. 17, 1971 |

[54] TRAILER-TYPE LIQUID CARRIER AND MIXER
10 Claims, 6 Drawing Figs.

[52] U.S. Cl. .................................................. 259/10
[51] Int. Cl. .................................................. B01f 7/02
[50] Field of Search .......................................... 259/9, 10,
6, 21—26, 8, 40, 41, 42, 43, 44, 45, 46, 91, 92, 93,
94, 109, 110

[56] References Cited
UNITED STATES PATENTS

| 711,524 | 10/1902 | Guiney | 259/93 |
| 1,279,544 | 9/1918 | Holcomb | 259/93 |
| 2,558,352 | 6/1951 | Gandrud | 259/110 |
| 2,960,320 | 11/1960 | Heider | 259/10 |
| 3,232,586 | 2/1966 | McClive | 259/177 |

*Primary Examiner*—Robert W. Jenkins
*Attorney*—Ronald L. Juniper

ABSTRACT: A trailer-type liquid carrier supported by wheels including an airtight tank for receiving liquid within which an axle encompassed by spiral vanes is contained and connected with one of the wheels so that as the wheel rotates the axle and spiral vanes correspondingly rotate.

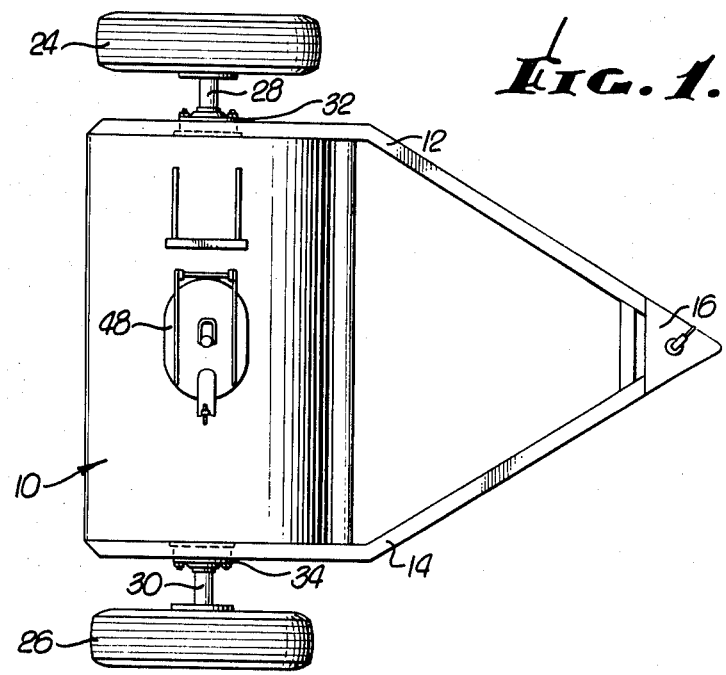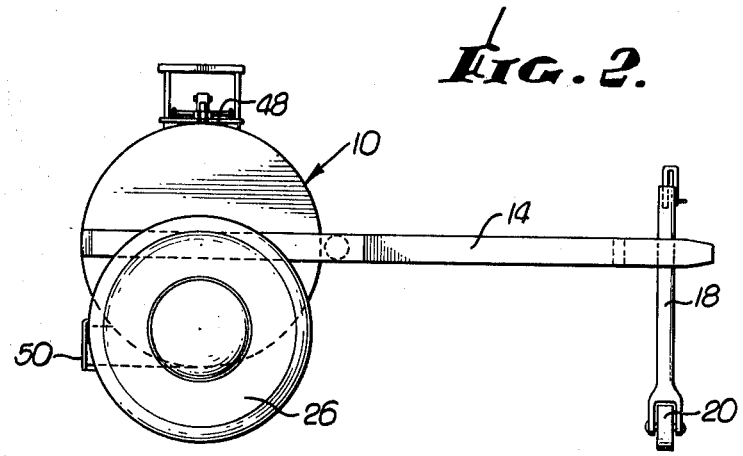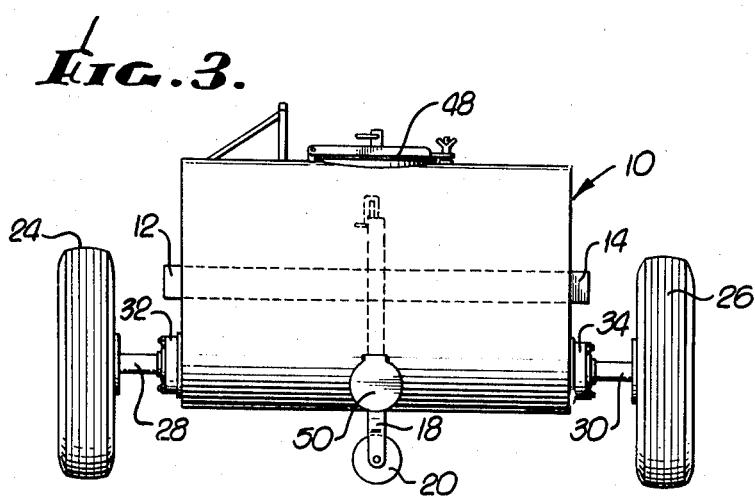

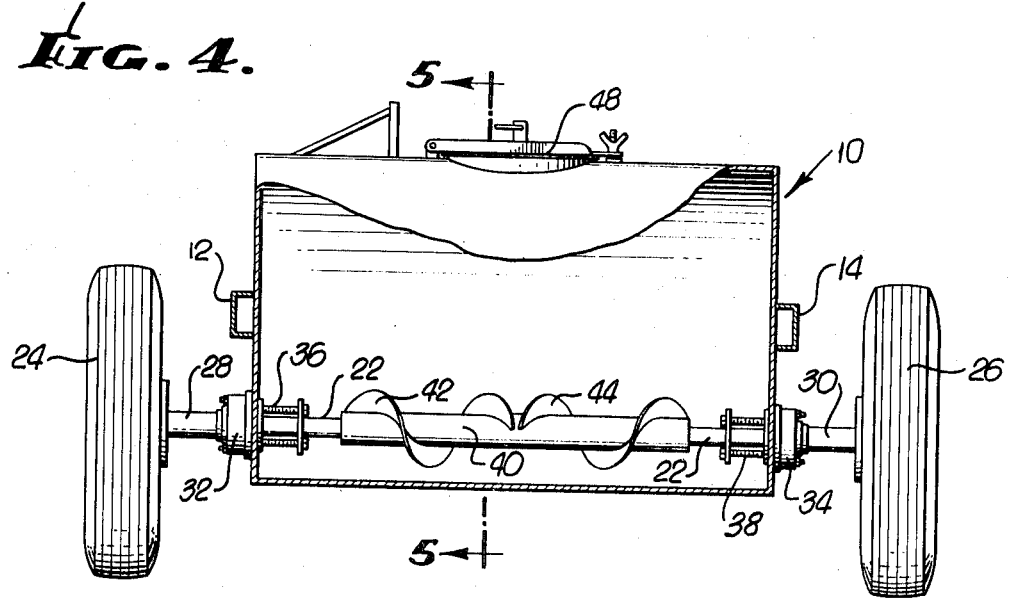
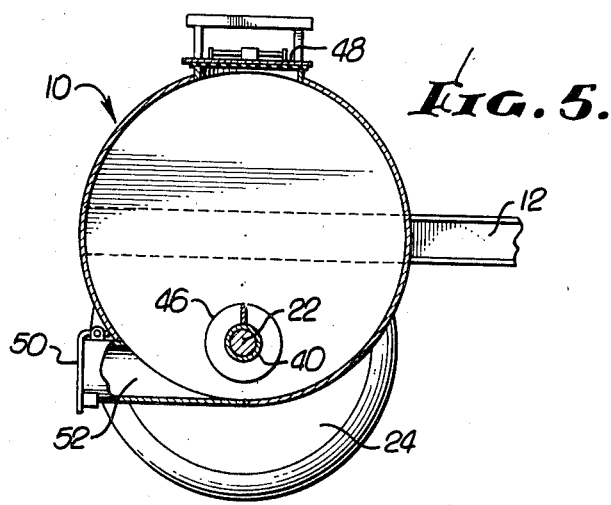
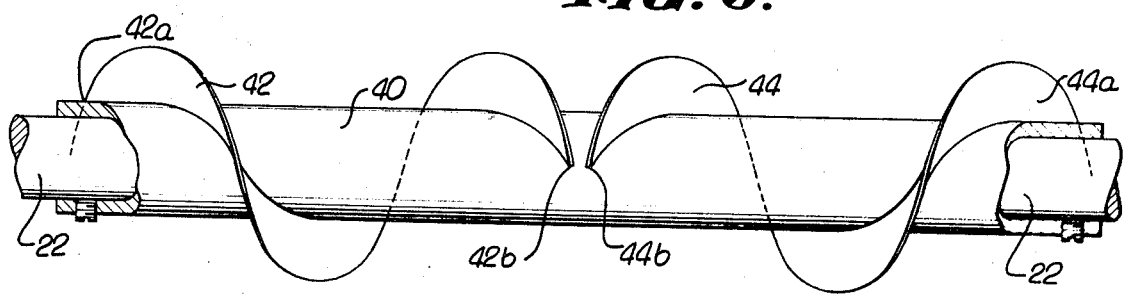

3,599,939

TRAILER-TYPE LIQUID CARRIER AND MIXER

BACKGROUND OF THE INVENTION

Liquid substances which require mixing and are to be transported from a production facility to a utilization area desirably, from the point of efficiency, are mixed while being transported and while using the motive power of the vehicle. An especially efficient manner for doing this is to connect an axle which passes through the receptacle carrying the liquid with a driving wheel and providing the axle with vanes so that as the vehicle moves the axle is rotated to agitate and mix the liquid in the receptacle.

However, prior to this invention the vanes in such a device, if they were adequate for mixing when turning slowly, caused so much resistance to rotation within the liquid when their rotational speed was increased that the vehicular speed was limited to substantially below normal road speeds.

If these problems were attempted to be alleviated by suitable reduction gear arrangements or connectors, the expense was raised so that a primary advantage of such a mixing system was eliminated. On the other hand if the vane size was reduced to the point at which the fluid resistance to rotation at high speeds was minimized, the vanes no longer satisfactorily mixed the surrounding liquid at low speeds.

Hence, a mixer of liquids contained in a tank within which a vaned axle was directly connected and turned by rotation of a vehicular wheel so that mixing of the liquid was achieved at slow speeds, but fluid resistance did not limit high-speed rotation was not available in the prior art.

Therefore, it is a primary object of this invention to provide a tank for holding liquids supported for travel by rotatable wheels which includes an axle carrying vanes within the tank that is connected to a wheel for direct rotation so that liquid within the tank is mixed at slow speeds and fluid resistance to rotation is not substantially increased at fast speeds.

Another object of this invention is to provide a trailer-type liquid carrier having a fluid agitator contained within tank connected for direct rotation with a wheel wherein the tank is sealed airtight during use.

Still another object of this invention is to provide a trailer-type liquid carrier which includes a tank within which is contained an axle directly connected for rotation with a vehicular wheel wherein the axle within the tank is encompassed with engaged spiral vanes.

Other objects and advantages of this invention will become apparent from the drawings and illustrative description.

Briefly, a trailer-type liquid carrier in accordance with this invention comprises an airtight closable tank for holding liquid which is secured by a trailer frame to vehicular wheels wherein an axle connected for rotation by engagement with one of the vehicular wheels includes encompassing spiral vanes so shaped and of sufficient depth, pitch and inclination that when rotated in a liquid contained within said tank at slow rates of speed sufficient turbulence is created to mix the liquid, but the amount of liquid resistance to rotation is limited as the speed of rotation increases.

BRIEF DESCRIPTION OF THE DRAWINGS

A device in accordance with this invention is illustrated by the drawings.

FIG. 1 is a top plan view of a sealer-mixer trailer in accordance with this invention.

FIG. 2 is a side elevational view of a sealer-mixer trailer as shown in FIG. 1.

FIG. 3 is an end elevational view of a sealer-mixer trailer as shown in FIGS. 1 and 2.

FIG. 4 is an axially sectional view of a sealer-mixer in accordance with this invention.

FIG. 5 is a cross-sectional view of the tank of a sealer-mixer as taken on lines 5–5 in FIG. 4.

FIG. 6 is an enlarged, partly fragmented elevational view of the axle portion within the tank of the sealer-mixer showing the helical mixing vanes.

DETAILED DESCRIPTION

Referring to the drawings, a preferred form of the trailer-type liquid carrier and mixer in accordance with this invention is as follows:

It includes a generally cylindrically shaped enclosed tank 10 supported by a pair of spaced, elongated parallel channel members 12 and 14 which are secured along the middle of opposite sides of the tank 10. These channel members 12 and 14 extend forward from the tank 10 and converge toward each other joining to form a V with a connecting plate juncture 16 at the apex. This juncture 16 includes a hitch (not shown) for connecting to a mating hitch of a towing vehicle. When unhitched, a retractable vertical leg 18 having a small wheel 20 rotatably carried on its lower end is used to support this portion of the trailer and is secured to the connecting plate juncture 16.

Extending horizontally through the lower center portion of the tank 10 and toward internal opposite sides of this tank 10 is an internal axle 22. A pair of automobile-size tires 24 and 26 rotatably connected, respectively, at their inside wheel hubs by left axle extension rod 28 and right axle extension rod 30, protrude from the opposite sides of tank 10. These rods 28 and 30, are, in turn, mounted for axial rotation in alignment with internal axle 22 within the respective bearing supports 32 and 34 secured to the opposite sides of tank 10.

Internally, the axle 22 is mounted for rotation at its opposite ends within packing glands 36 and 38 which are supported adjacent to the respective opposing internal walls of tank 10. Only the right wheel 26 is the driving wheel. It is interconnected through rod 30 and gland 38 with axle 22 so that as wheel 26 rotates axle 22 it is rotated the same amount.

Encircling the center portion of axle 22 and mounted thereon is a cylindrical axle cover 40 which carries a pair of matched, spiral, outwardly extending vanes 42 and 44 that each curved around the axle cover 40 from an opposite end thereof toward an adjacent common center termination point on the axle cover 40. The direction of the spiral on vanes 42 and 44 is opposing so that fluids are urged towards the common center termination point from the edges of the tank as the carrier is moved forward.

The preferred form of vanes is best illustrated in FIG. 6 wherein each of the vanes 42 and 44 is shown to taper to merging curved termination tapers 42a and 44a at each respective end of the axle cover 40 and then spiral to encircle the axle cover 40 once and form merging curved tapers 42b and 44b which are adjacent to each other at a common central location on the axle cover 40. In the form of this invention illustrated the diameter of a circle 46 which is traced by the outside edges of the vanes 42 and 44 when they are rotated is approximately twice the outside diameter of the axle cover 40. The axle 22, in turn, is disposed within the bottom center portion of the tank 10 so that the vanes 42 and 44 extend close enough to the bottom of the tank to provide suitable agitation for liquid in the tank. The vanes extend substantially the entire length of the tank.

The tank 10 is intended to serve as a trailered receptacle for certain types of liquid substances which are spread on asphalt surfaces as a sealer. The viscosity of such fluid "sealers" is often as thick as molasses and requires mixing before it can be properly applied to the asphalt. The agitator vanes 42 and 44, previously described, when rotated, provide this mixing function here. The sealer fluid is loaded into the top of the tank 10 through an inlet covered by a hinged inlet lid 48 which is provided with a gasket that, when locked closed, provides an airtight seal within the tank. A hinged outlet lid 50 (normally closed) covers the fluid outlet 52 in the lower center portion of the tank 10 and when locked closed provides an airtight seal until opened to release sealer fluid contained therein.

In use, a quantity of liquid sealer which is desired to be transported and mixed is poured into the top opening on the tank 10 and the inlet lid 48 is closed (the outlet lid 50 of course being closed at this time) to thereby produce an airtight retaining receptacle within the tank 10. Then the trailer is hitched to a suitable towing vehicle. When the trailer is towed the axle 22 and secured vanes 42 and 44 rotate in accord with the rotation of the interconnected wheel 26.

This rotation, in turn, causes, at low speeds, sufficient agitation of the liquid sealer to mix it. Hence, as the trailer is towed, the liquid sealer is, in effect, automatically mixed. However, when conventional vanes are rotated in a liquid, the speed of the towed trailer would be limited because increases in speed generally increases the resistance of the liquid to the vane rotation until a point is reached at which attempts to pull the trailer faster are not practical. With the asphalt sealer liquid having a viscosity similar to molasses this limited speed is generally below that desired for normal road travel of the vehicle.

If a conventional agitator vane is reduced in size to the point at which it can rotate within a liquid sealer without causing undue resistance when rotated at a high rate of speed, it is generally too small to provide the agitation of the liquid sealer desired.

This dilemma is solved by using the spiral vane agitators in accordance with this invention as previously described in more detail. Here sufficient surface area is presented on the spiral vanes 42 and 44 that the liquid sealer in the tank 10 is mixed sufficiently when they are rotated at low speeds. At the same time, as the speed of rotation is increased the spiral vanes 42 and 44 do not correspondingly increase their resistance to rotation since, because of their special spiral shape they begin to, in effect, burrow a hole within the liquid sealer thereby minimizing the amount of turbulent agitation and consequent resistance to rotation within the liquid sealer. Because of this phenomenon the speed of the towed trailer can be increased to normal highway speeds without causing excessive resistance to rotation by the vanes turning within the liquid sealer.

When the liquid sealer is poured into the tank 10 and before it is transported at highway speeds as heretofore described, the lids 48 and 50 are closed tightly so that a substantially airtight seal is provided. Thus, undue froth and air leakage is prevented so that the desired agitation at slow speeds and minimum turbulence at high speeds is achieved. This facilitates the mixing process and further increases the advantages of this invention.

The liquid sealer which is to be carried and mixed by this invention generally includes material of varying consistencies such as mica, asbestos and lampblack. In an ordinary mixer if the liquid loaded with such solid materials is allowed to stand, the solids will settle to the bottom and require an extraordinary amount of power to start the mixer in motion. Because of the construction of this mixer and its airtight lid, this settling problem is alleviated. The use of the terminology "liquid" and "liquid sealer," accordingly, is intended to include liquids containing other materials of varying consistency.

Hence, this carrier and mixer invention provides a means of economically and efficiently transporting coating and sealing materials to a worksite. In addition, the problem of preparing the materials to the smooth consistency needed for its application to the surface to be coated is minimized. Moreover, excess material can be conserved in this invention in a state where it can be conditioned for reuse without special power facilities or rehandling.

Though a particular embodiment of this invention has been described herein this is not intended as a limitation upon the forms of this invention which is intended to cover variations which are in accordance with the spirit of the following claims:

I claim:

1. A trailer-type liquid carrier comprising: a tank for holding liquid; inlet means for said tank; outlet means for said tank; a trailer frame secured to said tank, said frame including a hitch for engaging with s towing vehicle; an axle tranversely mounted for rotation within said tank, said axle including a pair of axle extension rods axially aligned with said axle and protruding from opposite sides of said tank, at least one of which is engaged with said axle for common rotation therewith; a pair of wheels supporting said trailer-type liquid carrier each of which are engaged for rotation on one of said axle extension rods and at least one of which is engaged with an axle extension rod which is engaged with said axle thereby providing a driving wheel; and spiral vanes engaged with and encircling said axle, said vanes projecting outwardly from said axle and having a curved spiral shape of sufficient depth, pitch and inclination that when rotated in a liquid contained within said tank at slow rates of speed sufficient turbulence is created to mix the liquid, but the amount of liquid resistance to rotation is limited as the speed of rotation increases because of a tunneling phenomenon of the spiral vanes within the liquid.

2. A trailer-type liquid carrier as defined in claim 1 wherein said tank is a closed receptacle and said inlet means and outlet means are each provided with closable lids which, when closed, seal said tank airtight.

3. A trailer-type liquid carrier as defined in claim 1 wherein the spiral vanes include a pair of sections each spiraling from opposite ends of the axle to an adjacent common central portion of said axle.

4. A trailer-type liquid carrier as defined in claim 1 wherein the axle is disposed within the bottom center portion of said tank so that the encircling and engaged vanes extend close enough to the bottom of the tank to provide agitation for liquid in the tank.

5. A trailer-type liquid carrier as defined in claim 1 wherein the spiral vanes are a pair of matched, outwardly extending vanes which each curve from an opposite end of the axle toward an adjacent common center termination point on said axle.

6. A trailer-type liquid carrier as defined in claim 1 wherein said axle is mounted for rotation and supported within said tank by packing glands on its opposing remote ends within said tank and the axle extension rods are supported by bearings on the opposite outer sides of said tank.

7. A trailer-type liquid carrier as defined in claim 1 wherein the tank is generally cylindrical in shape and substantially aligned axially parallel with the axle which is transversely carried within it.

8. A trailer-type liquid carrier comprising: a generally cylindrically shaped enclosed tank; inlet means and outlet means in said tank each of which are provided with closable lids which, when closed, provide an airtight seal within said tank; a pair of elongated channel members secured on opposite sides of said tank which extend forward and converge to join at a connecting juncture; means for hitching a towing vehicle to said connecting juncture; an internal axle extending horizontally within said tank mounted at its opposing ends for rotation at the opposite sides of said tank; a pair of axle extension rods protruding from the opposite sides of said tank and axially aligned with said internal axle, at least one of said axle rods being engaged with said internal axle for rotation therewith; a pair of wheels connected by their inside hubs, respectively, to each of said axle extension rods, one of said wheels being engaged to the axle extension rod engaged with said internal axle for consequent rotation; and spiral, outwardly extending vanes encircling said internal axle.

9. A trailer-type liquid carrier as defined in claim 8 wherein said internal axle is provided with an encircling engaged axle cover, the spiral vanes are engaged on said axle cover and said vanes extend substantially the entire width of said tank.

10. A trailer-type liquid carrier as defined in claim 9 wherein the vanes comprise a pair of vanes which each taper to merging curved terminations at the opposite ends of the axle cover and spiral in opposite directions toward a common central termination point on said axle cover, said spiral curved so that as said carrier is moved forward, fluid contained in said tank will be mixed and urged from the edges of said tank to a central position therein.